Aug. 22, 1950     H. M. FREDHOLM     2,519,364
TRAILER JACK
Filed Dec. 14, 1948
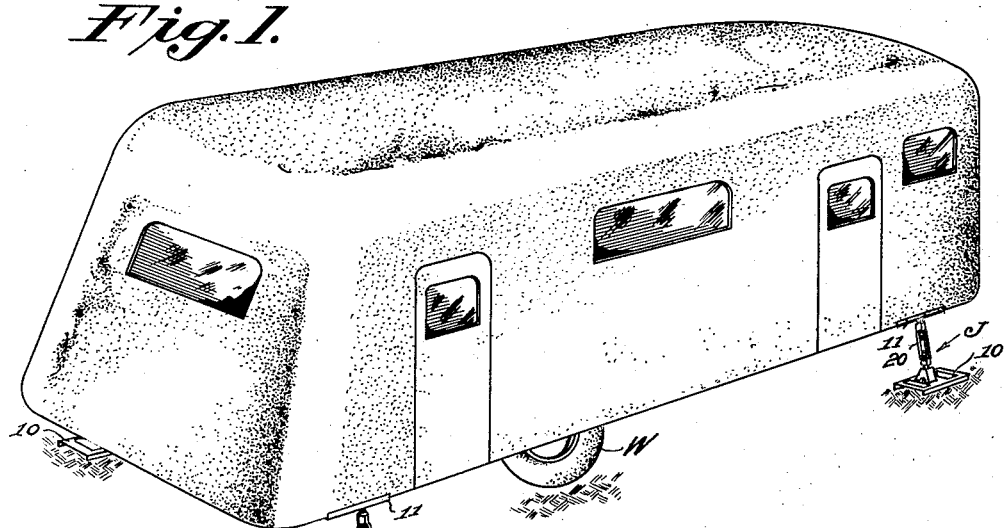
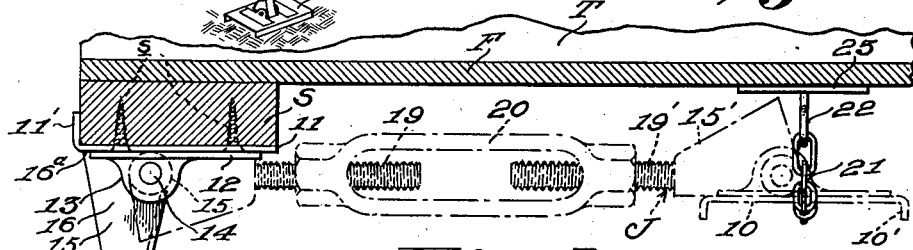
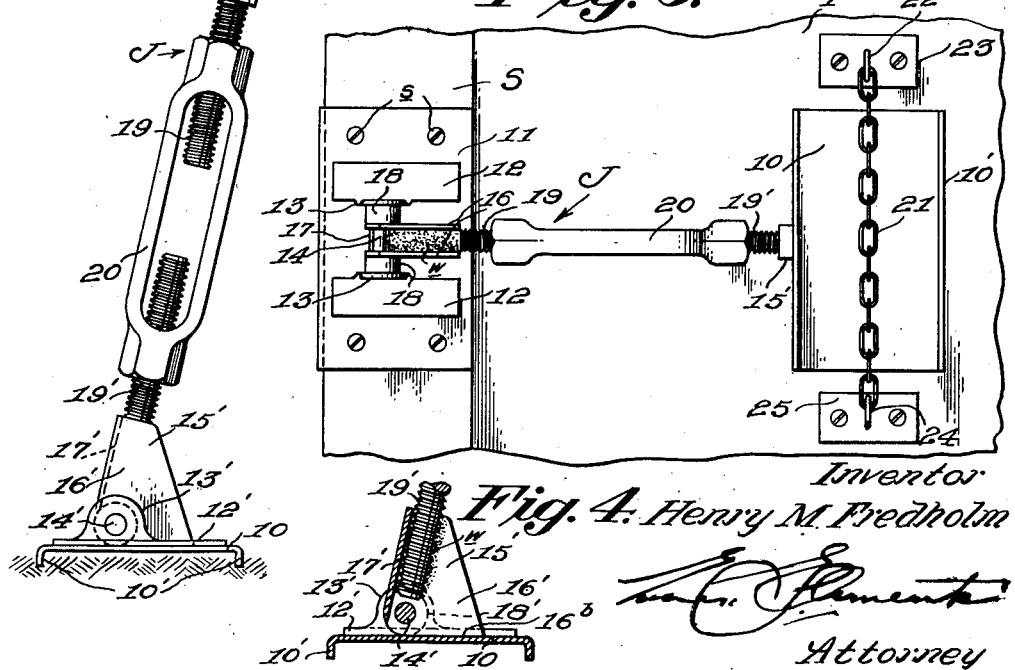
Inventor
Henry M. Fredholm
Attorney Patented Aug. 22, 1950

2,519,364

UNITED STATES PATENT OFFICE 2,519,364

TRAILER JACK

Henry M. Fredholm, Midlothian, Ill.

Application December 14, 1948, Serial No. 65,099

7 Claims. (Cl. 254—86)

This invention relates to a trailer supporting jack. The invention is more particularly concerned with a combined jack and support by the use of a plurality of which, a trailer may be leveled and supported in stabilized position, and if desired the supporting wheels thereof relieved of the weight of the trailer body thereon.

As is generally known, a trailer is supported on a single pair of transversely alined wheels which are disposed intermediate the opposite ends of the trailer body and the body is maintained in a generally horizontal position when it is attached to a draft vehicle. When, however, it is desired to put-up over night or for a longer period of time, the trailer is usually parked in a trailer camp, or possibly at some other location, at which time it is usually detached from the draft vehicle, in which event it is necessary to slack the end of the trailer from which the draft vehicle has been released to prevent such end resting on the ground, with the result that the floor thereof is substantially inclined from one end of the trailer to the other.

Whether or not the draft vehicle is detached, the trailer may be parked at a location wherein the wheels do not support it with the floor level transversely of the trailer body, and with the draft vehicle attached the trailer body is capable of substantial movement about the axes of the supporting wheels.

Furthermore, it is desirable to relieve the wheels of the weight of the trailer body when same is parked for a substantial period of time in order to conserve the life of the pneumatic tires with which such wheels are usually equipped.

Accordingly, it is a primary object of the present invention to provide improved trailer body supporting jacks, by the use of which the body may be expeditiously leveled, supported in stabilized position, and the supporting wheels relieved of the weight of the body.

A further object of the invention is to provide a trailer body supporting jack which in operative position includes a horizontal ground engaging plate, a horizontal trailer body engaging plate substantially offset from the ground engaging plate in a direction toward the center of the trailer body and axially adjustable screws having the opposed ends thereof pivotally connected to the plates, whereby a laterally disposed pair of such jacks will provide lateral bracing of the trailer body as well as vertical support therefor.

A still further object of the invention is to provide a trailer body supporting jack pivotally attached to the frame of the body adjacent each corner thereof, the jacks including other pivotal connections whereby the same are capable of being positioned in flattened condition beneath the floor of the trailer body when not in use and are equally capable of being swung to operative positions for proper adjustment thereof for effectively raising, leveling and supporting the trailer body.

Other objects and advantages of the invention will become apparent in the course of the following detailed description, taken in connection with the accompanying drawing, wherein—

Fig. 1 is a perspective view of a trailer showing a plurality of the improved leveling and stabilizing jacks operatively associated therewith;

Fig. 2 is a transverse sectional view of a side portion of the trailer showing one of the supporting and stabilizing jacks connected thereto in accordance with a preferred embodiment of the invention, the view also showing the jack in inoperative position in dot-and-dash lines;

Fig. 3 is a bottom plan view of the jack in its inoperative position shown in Fig. 2;

Fig. 4 is a vertical sectional view through the ground engaging plate and its associated bracket.

Referring now in detail to the drawing T designates a trailer which is of the general form and construction of trailers now in general use, and which in accordance with common practice embodies a pair of wheels disposed intermediate its front and rear ends, one of such wheels being shown in Fig. 1 and designated W.

The trailer is shown in Fig. 1 in leveled and stabilized position by use of a plurality of the improved jacks J, and while only portions of three jacks are visible in this figure, four thereof are preferably utilized to level and stabilize the trailer when detached from a draft vehicle, the jacks also serving to take the weight of the trailer off the wheels.

Each jack in accordance with a preferred structural embodiment thereof comprises a ground engaging rectangular plate 10 and a similar trailer body engaging plate 11, the plate 10 being preferably provided with ground penetrating flanges 10' at its opposite edges, and the plate 11 being provided with a single flange 11' at one edge thereof for engaging the outer side wall of the trailer, as is clearly shown in Fig. 2.

The plate 11 is provided with a pair of relatively small rectangular plates 12 which are disposed transversely of the plate 11 and rigidly secured thereto by welding or any other suitable means. The plates 12 are disposed in parallel and spaced relation and are provided with ears 13 on their adjacent inner edges. The ears 13 are apertured for the reception of the opposite ends of a pivot pin 14 whose opposite ends are preferably flush with the outer surfaces of the ears.

A bracket 15 is swingably supported on the pin 14 and said bracket is preferably of U-form in cross section, the bracket including a pair of side walls or plate portions 16 and an end wall 17, and the side walls are apertured for passage of the pivot pin 14. The bracket is substantially of less width than the distance between the ears 13 and in order to preclude movement of the bracket axially of the pin, a pair of spacing sleeves 18 are disposed between the ears and the opposite sides of the bracket. The sleeves surrounding the pin and same are preferably rigidly secured to the plate 11 and the pin 14 is preferably rigidly retained in the ears and sleeves for non-rotation thereof, the bracket however being freely rotatable on the pin.

A screw in the form of a screw threaded rod 19 has one end thereof disposed within the channel of the bracket 15 defined by its walls 16 and 17, and the end of the rod is rigidly supported in the bracket as by welding w.

The ground engaging plate 10 is provided with plates, ears, pivot pin, bracket and sleeves, which correspond to those on plate 11 and are designated by the same reference characters except that same are primed.

A second screw embodying a screw threaded pin 19' has one end thereof rigidly supported in the bracket 15'. The screws are axially alined, oppositely threaded and are interconnected by means of a yoke nut 20 by means of which the screws together with the brackets and plates 10 and 11 may be moved toward and away from each other.

It is to be particularly noted that the side walls 16 and 16' of the brackets 15 and 15' have their free edges diverging from the end walls 17 and 17' in the direction of the respective plates 11 and 10, whereby providing relatively long edges 16ª and 16ᵇ for contact with the plates 11 and 10 (Fig. 4), and such edges are at an acute angle to the edges 16 and 16' as well as the screws 19 and 19' whereby in operative position of the jack the alined screws 19 and 19' are inclined relative to the horizontally disposed plates 10 and 11 with the result that the trailer engaging plates 11 are disposed nearer the longitudinal center of the trailer body than are the ground engaging plates 10, which in the use of laterally opposed jacks provides maximum stabilization of the trailer body.

While the jacks may be wholly separate from the trailer and be carried or stored for use when desired, the jacks are preferably permanently carried by, although being readily separable from the trailer. Accordingly, the jacks are preferably carried by the side sills S beneath the floor F of the Trailer T, and to accomplish such, the plates 11 are apertured for the reception of screws s which engage the sills S, as shown in Figs. 2 and 3.

With the plates 11 thus secured and having their flanges 11' engaging the outer walls of the trailer, each jack is pivotally supported from its plate 11 underneath the floor F and since the brackets 15 and 15' together with the screws 19 and 19' and the pivotally connected ground plate are readily swingable about the pivot pin 14 and into parallel planes with the floor of the trailer, each jack may occupy the minimum of space beneath the floor. The jack is retained in its flattened or inoperative position by any suitable means, such for example as by means of a chain 21 having one end thereof secured to an eye 22 carried by a plate 23 secured to the floor F, and the other end of the chain is releasably engaged by a hook 24 carried by another plate 25 secured to the floor F. In this position of the pivotally connected parts as illustrated in Figs. 2 and 3, the plate 10 may be moved toward or away from the fixed plate 11 and the retaining means 21 by the yoke nut 20.

The eye 22 and hook 24 are preferably so disposed that the chain 21 lies against the bottom of plate 10 between the flanges 10' thereof. With the jacks J positioned in inoperative position as in Figs. 2 and 3, they are immediately available for use upon parking the trailer at any time and at any place. To render the jacks operative it is necessary only that the chains 21 or other suitable retaining means be released and the jacks allowed to fall (swing about pivot pins 14).

While it may be that the contour of the ground at such place may be such that some or all the jacks are too long when dropped, the same may readily be shortened by turning the yoke nuts 20 so that the plates 10 will clear the ground in order that the bracket edges 16ª and 16ᵇ will contact the respective plates 11 and 10 and with the jacks inclined as in Figs. 1 and 2. After thus positioning the jacks, they are vertically adjusted by means of the nuts 20 to such extent that the floor F is leveled, the entire body raised to an extent to relieve the wheels W of the weight thereof, and the jacks due to their inclined positions will support the trailer body and brace same against any possible lateral sway.

As before stated, the jacks may be separate from the trailer body and one or more thereof may be used as given circumstances may dictate but each will function in the same manner whether it is free of or connected to the trailer body.

While I have disclosed my invention in accordance with a single specific embodiment thereof, it is to be considered as illustrative only, and not restrictive, the scope of the invention being defined in the subjoined claims.

What I claim is:

1. A supporting jack for trailers, comprising a ground engaging plate, a trailer body engaging plate, a bracket of channel formation pivotally connected to each plate, a pair of oppositely threaded axially alined screws having their opposite ends rigidly secured in the channels of said brackets, and a yoke nut spanning the adjacent spaced ends of the screws and having screw thread engagement therewith.

2. The structure according to claim 1 wherein said pivotal connection is effected by means of apertured ears on the plate, and a pivot pin extending through the apertures in said ears and apertures in opposed walls of the bracket.

3. The structure according to claim 1, wherein said pivotal connection comprises a pin extending through alined apertures in opposed walls of the bracket, a pair of apertured ears rigidly supported by the plate in laterally spaced relation to the opposite walls of said bracket and in the aperture of which the ends of said pin are supported, and a spacer sleeve surrounding said pin between each ear and the adjacent wall of said bracket.

4. The structure according to claim 1, wherein each bracket comprises opposed side walls and an end wall, the free edges of the side walls diverging from said end wall in the direction of the plate to which the bracket is pivotally connected, the edges of said side walls adjacent the plate being at an acute angle to said end wall and being engageable with the plate in the operative position of the jack, and the screws being parallel with said end wall, whereby in the operative position of the jack the screws incline toward the longitudinal center of the trailer.

5. Supporting, leveling and stabilizing means for a trailer body, comprising a supporting jack including a plate secured to the trailer body beneath the floor thereof and adjacent each corner of the trailer body, each jack further including a bracket pivotally connected to the plate and including side walls having plate engaging edges to limit outward swinging of the bracket and the walls being rounded adjacent the pivotal connection to permit inward swinging of the bracket to a position beneath the floor and substantially parallel thereto, each jack further including a second bracket having a ground engaging plate pivotally connected thereto, a screw having one end thereof rigidly supported by each bracket, a nut threadedly engaging the screws intermediate said brackets, and releasable means carried by the trailer floor engageable with each jack to retain same in inoperative position beneath the floor of the trailer.

6. The structure according to claim 5, wherein the ground engaging plate of each jack is disposed parallel to said floor in the inoperative position of the jack, and wherein said means comprises a chain releasably engaging said ground engaging plate.

7. A jack as specified in claim 5 in which the brackets are each formed of spaced plate portions to the opposed sides of which one end of said screw is rigidly secured throughout a substantial longitudinal extent of the screw.

HENRY M. FREDHOLM.

No references cited.